United States Patent [19]

Easton et al.

[11] 4,416,367
[45] Nov. 22, 1983

[54] TROLLEY AND CHAIN CLEANER

[75] Inventors: Richard L. Easton, Rives Junction; Richard H. Friedlund, Jackson, both of Mich.

[73] Assignee: LubeCon Maintenance Systems, Inc., Fremont, Mich.

[21] Appl. No.: 297,099

[22] Filed: Aug. 28, 1981

[51] Int. Cl.³ .............................................. B65G 45/00
[52] U.S. Cl. .................................. 198/496; 104/279; 15/21 E
[58] Field of Search ............... 198/494, 496; 15/21 D, 15/21 E, 55, 77, 88, 53 AB; 104/279, 280, 172 R, 168, 246

[56] References Cited

U.S. PATENT DOCUMENTS

| | | |
|---|---|---|
| 1,883,223 | 10/1932 | Wood . |
| 2,083,864 | 6/1937 | Puckett ............................ 198/230 |
| 2,244,670 | 6/1941 | Benedict ........................... 198/496 |
| 3,229,808 | 1/1966 | Olson ................................. 198/496 |
| 3,786,779 | 1/1974 | Brunel ................................... 118/4 |
| 3,858,715 | 1/1975 | Brock et al. ...................... 198/496 |
| 3,935,610 | 2/1976 | Vogt ................................... 15/21 R |
| 3,957,155 | 5/1976 | Enchelmaier ..................... 198/230 |

FOREIGN PATENT DOCUMENTS 2148299  4/1973  Fed. Rep. of Germany ...... 198/496

Primary Examiner—Joseph E. Valenza
Assistant Examiner—Jonathan D. Holmes
Attorney, Agent, or Firm—Miller, Morriss & Pappas

[57] ABSTRACT

A conveyor trolley and chain cleaner which straddles the conveyor track and drives a pair of askew mounted brushes in counter directions while urging the brushes toward resilient contact with track chain and parts moving thereon. The motor and drive means are tensioned and provide overload slippage.

6 Claims, 3 Drawing Figures

TROLLEY AND CHAIN CLEANER

The present invention relates to a conveyor trolley and chain cleaner combination and more particularly to a system of driven brushes resiliently urged toward each other so as to resiliently and operably engage structures passing between the brushes and wherein the brushes in rotation oscillate or sweep the passing material and in a tangential and lateral manner effectively to dislodge accumulated debris and superfluous lubricant or scale.

The present invention is particularly directed to conveyor drive and trolley structures where the trolley, its carriages, wheels and drive chain move on or adjacent the flanges of an I or H beam track structure. As desired, the elevation of the present invention may be adjusted to sweep parts or apparatus carried on or by the trolley, chain and track of the conveyor apparatus. The sweep occurs as the chain, trolley and carried apparatus pass between the sweep zone of the brushes. A protective cage prevents undue scattering of debris and causes the debris to drop vertically for collection or disposal.

Many devices have been utilized to clean conveyor trolley and chain. One such unit which is reasonably characteristic of one group of such prior units is seen in the U.S. Pat. No. 3,957,155 of Harvard W. K. Enchelmaier directed to a single elongate brush which is located beneath the conveyor structure and is urged arcuately and upwardly. There is no combined rotation and sweeping from two positions and the drive carriage postures the brush transverse of and beneath the moving conveyor line and the brush unit is urged into contact with structure moving on its conveyor.

In U.S. Pat. No. 3,935,610 to Norman H. Vogt, a cart is provided which carries means for elevating a washing or cleaning head including hydraulic driven brushes into contact with the trolley and trolley drive elements. There are vertical driven brushes and horizontal brushes driven from hydraulic motors and the brushes are resiliently closed on each other in a pivotal relation. There is no expression of "sweep" as generally expressed in the device of the present invention. The underlying thought is to intermittently clean or scrub the trolley-track structure in butcher shops and the like.

In the U.S. Pat. No. 3,786,779 to Roger L. Brunel, et al, the inventors therein addressed themselves to a structure having vertical and horizontal axis brushes and the structure rides on a carriage movable on an overhead rail. This carriage device is generally characteristic of other devices which ride on or move on the conveyor rail.

Narrower types of moving brush assemblies are suggested in U.S. Pat. No. 4,091,492 of Ronald E. Thomson and these are pulled along the conveyor rail. Sets of brushes are mounted on U-shaped brush retainers and the brushes are urged toward contact with the rail or track element.

The devices of H. A. W. Wood and W. M. Puckett in U.S. Pat. Nos. 1,883,223 and 2,083,864, respectively, are directed to driven brushes, cleaning chain and the like moving along and past the brush stations.

None of these structures are seen to incorporate a wobbling brush functioning as a result of driving brushes which are mounted askew to their driving hub axis. The simplicity of the drive and mounting means for such brushes so that they are installable on the rail of a conveyor are appreciated in contrast to the structures reviewed. Especially important is the fact that the present invention is useable with relatively narrow brushes with attendant extended life and where the oscillating sweep of the brushes complements the driven rotation of the brush in reaching and cleaning obscure portions of the trolley and the chain riding on the track or rail as it continuously passes. The economy of effective use of the smaller brush while proving an efficient extension of the contact area served is of inventive significance.

The present invention incorporates its drive means independent of the trolley movement and can be switched off as desired, for example, with the cessation of conveyor movement. The structure is proposed to operate when the conveyor operates to provide continual cleaning of trolley and chain. The structure is belt driven to provide a clutch-like relief in the event of jamming or malfunction. The mounting of the brushes at a relatively median angle between vertical and horizontal assures a sweep for the entire height of the trolley and height of the chain and eliminates prior art expensive wide brush assemblies. The framing and support of the driven brushes makes the bias of the brushes toward the surfaces to be cleaned both simple and effective. The present invention continuously cleans the conveyor chain, trolley and attachments to remove surplus lubricant, paint, rust, and scale effectively. Further, the spring loaded drive connector keeps the drive belts taut. The caging for shielding debris dislodged by the present structure is simple, easily supported by the mounting plate and results in break-up of the debris with a vertical drop below the cleaning unit.

Accordingly, the principal object of the present invention is to provide a sweep action of a simple, relatively narrow brush while rotating the brushes with attendant mentioned economies.

Another object is to provide a simple and effective frame mount for driven brushes and including means for cantilevering the brush support arms, tensioning the drive belts and closing the brushes on the moving elements which require cleaning.

Other objects are a part of the present contribution and include simplification of the problem of cleaning and scraping trolley, chain, track, and moving equipment without interference with normal operational requirements and will all be appreciated as the description proceeds.

GENERAL DESCRIPTION

In general, the present invention is a trolley and chain cleaner combination for conveyor units comprising a pair of askew mounted powered brushes which are resiliently urged toward each other while driving. The drive means is connected to the brushes and the resilient means causes the brushes to close on opposite sides of the conveyor, moving chain, trolley, and materials carried by the trolley. A mounting base or platform is provided which is easily secured to the conveyor track. The base supports a motor bracket at one end and the bracket is resiliently biased so that any motor mounted on the bracket is placed under an operational tautness in belt driving the brushes. At the end of the base from the mounting bracket a pair of arms are attached. The arms pivot on the base and are supported by the base so that they are movable toward and away from each other. A resilient bias urges them toward each other. The pivot arms include journal means on each outboard end which supports a drive shaft therethrough. The shafts extend to driving connection with brushes and the brushes are in an askew relation to their hubs and the axles therefor. The drive transmission is preferably by means of drive belts and one of the belts is crossed between the motor and the shaft so that the brushes are rotated in a countering direction from the same motor. Pulleys keyed to the shafts and pulleys on the motor shaft provide the preferred drive connection. In operation, the driven brushes perform a sweeping operation with a wobble-like movement, the consequence of the askew mounting of the brushes in respect to their drive. This allows a broad coverage with relatively thin brushes and with attendant economies. Wider brushes commonly used before the present invention are expensive and are prone to wear in a pattern imitative of the chain position, the moving trolleys and encountered apparatus. The brushes of the present invention are wear compensating and wear generally evenly under the resilient closing bias. The brushes are caged so that the debris swept from rails, trolley and chain drops vertically as it is stripped from the passing trolleys, chain and other apparatus.

IN THE DRAWINGS

SPECIFIC DESCRIPTION

Figure 1:
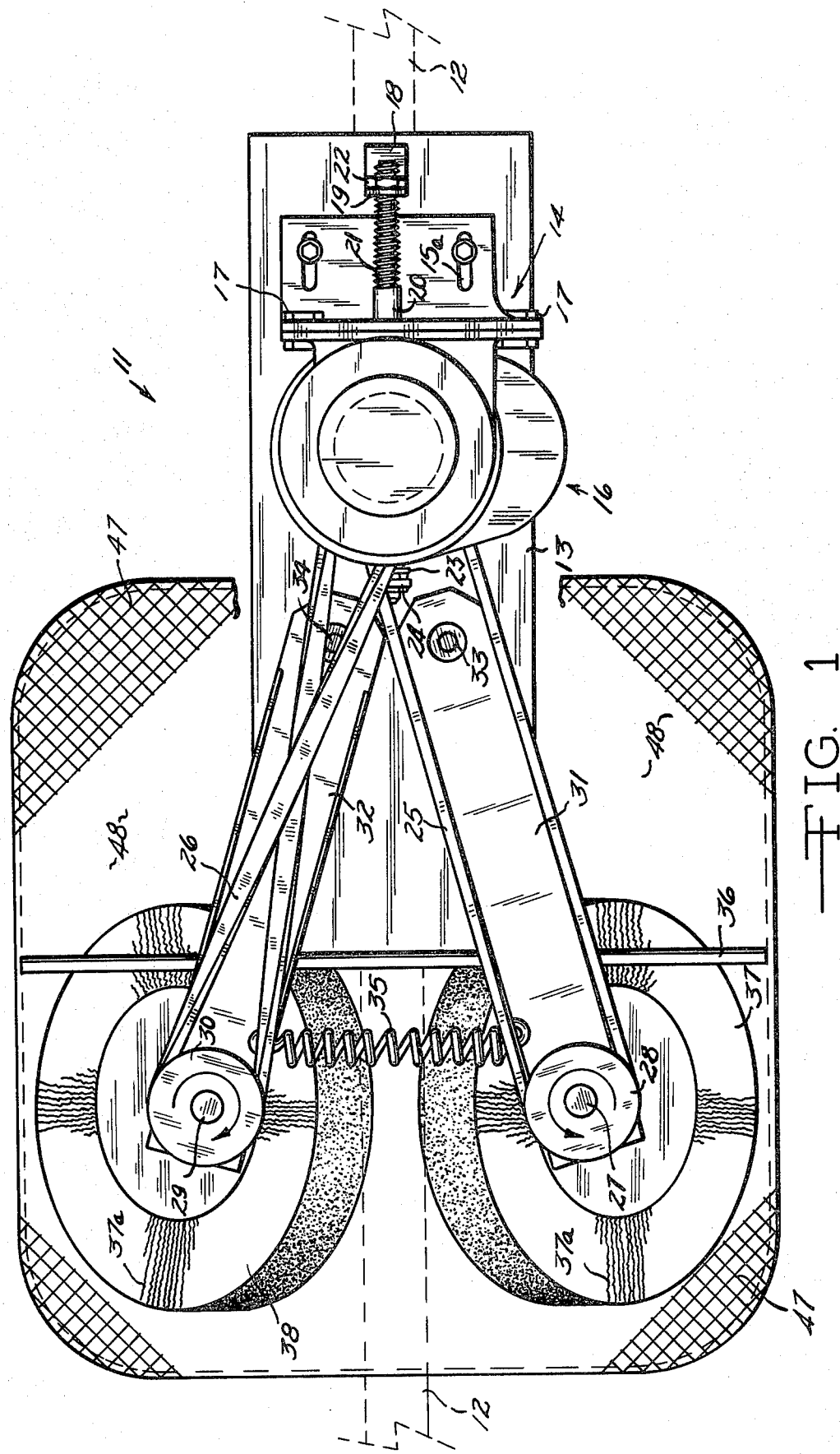
FIG. 1 is a top plan view of a trolley and chain cleaner for conveyor units in accord with the present invention fastened to a conveyor track (shown in phantom line) and with the caging partially cut away to clearly reveal the simplicity of assembly and mounting.

Referring with particularity to the drawings and with first attention to the FIG. 1 thereof, the trolley and chain cleaner combination 11 is seen mounted on the upper flange of a conveyor rail or track 12. A base mounting 13 is secured firmly to the track 12 as by bolts, welding, clamp, or other well known fastening means. At one end of the base mounting 13 is a motor bracket 14. The motor bracket 14 is slidably attached to the base mounting plate 13 by the bolts 15 in correspondingly positioned slots 15a and the bracket 14 is secured to the motor 16 by means of the bolts 17. An angle brace 18 is welded or otherwise fastened to the base 13 and the upstanding leg 19 of the brace 18 carries a tension rod 20. The tension rod 20 includes a threaded portion 21 which runs out at the end of the rod 20, as seen, and with the mating nut 22 and the spring 23 and stop 24 provides means for resiliently and continually urging the whole assembly of the motor 16 and motor bracket 14 toward the brace 18. As will be seen, the object of this arrangement is to assure tautness in the drive elements such as the V-belts 25 and 26.

The V-belt 25 is connected at one end to the motor 16 and at the other end is operably connected to the shaft 27 as by the pulley means or sheave 28 fastened to the shaft 27. The V-belt 26 is twisted as seen in FIG. 1 but is also drivably connected to the motor 16 and is also connected to the shaft 29 as by means of the pulley or sheave 30. The shafts 27 and 29 are supported in vertical journals which are adjacent the outboard ends of the pivotal arms 31 and 32, respectively. The inboard ends of the pivotal arms 31 and 32 are pivotally journalled and attached to the base frame 13 at the pivots 33 and 34, respectively. Accordingly, the arms 31 and 32 are symmetrically mounted on the frame 13 on either side of the rail or conveyor track 12 to which the frame 13 is secured. The arms 31 and 32 are also movable toward and away from each other and are biased toward closing contact by the resilient means such as tension spring 35. The arms 31 and 32 are supported on the bar 36 in cantilever fashion and the bar 36 is fastened to the frame 13 in prevention of snag in the arms 31 and 32. Accordingly, the arms 31 and 32 are shiftable on the platform of the bar 36 subject only to frictional drag. The shafts 27 and 29 drive brushes 37 and 38, respectively, via askew mounting of the brushes 37 and 38 to the shafts 27 and 29, respectively. The bristles or spicules 37a of the brushes 37 and 38 extend radially from the center of the brushes 37 and 38 and the hubs of the brushes 37 and 38 are askew to the general plane of the brushes 37 and 38 so that the askew relationship causes the brushes 37 and 38 to wobble in a controlled sweeping manner while rotating. Thus, with the brushes 37 and 38 at about 45 degrees from the vertical axis of the shafts 27 and 29, respectively, a sweep area approximately equal to the diameter of the brushes 37 and 38 is subject to sweeping and rotational oscillations while the brushes 37 and 38 close toward each other. Accordingly, a relatively narrow brush, say one inch having a diameter of eight inches, effectively sweeps parts moving between the brushes over a zone or band of about eight inches or ample to clean most chain, trolleys, and hangers or apparatus moving on the rail or track 12.

Figure 2:
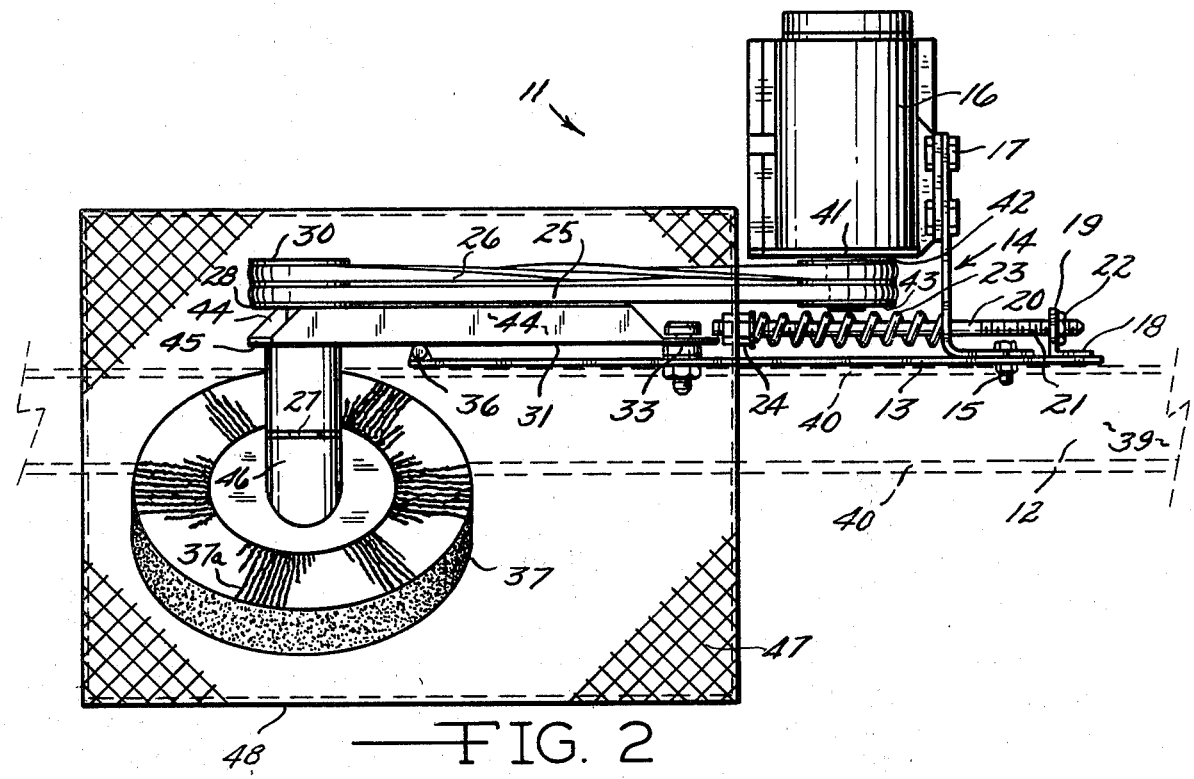
FIG. 2 is a side elevation view of the structure shown in the FIG. 1 and best indicating the spring biased motor carriage or bracket and with debris cage partially cut away.

In the FIG. 2 the track 12 is shown in phantom line and is in the form of an I or H structural shape and the brushes 37 and 38 close toward the web portion 39 of the rail 12 and, as will be understood, the rail flanges 40 (top and bottom) support trolley rollers or wheels (not shown) which move therealong. The rollers move on the lowermost of flanges 40. The generally L-shaped character of the motor bracket 14 is best shown in FIG. 2 and to which the motor 16 is fastened by bolts 17. The bracket 14 is secured to the base frame 13 by the bolts 15 which allow the bracket 14 and motor 16 to float in accord with the selected compression of the spring 23 on the rod 20. The rod 20 passes through the bracket 14 and is adjustably connected to the frame 13 at the angle brace 18. Adjustment is achieved by selectively running the nut 22 onto the threaded portion 21 of the rod 20 and compressing the spring 23 against the frame 14. The thrust buttress on the rod 20 is at stop 24 so that the spring 23 acts on the stop 24 and also against the frame 14 and by means of the nut 22 (fixed against displacement by the upstanding leg 19 of the brace 18), the tension on the V-belts 25 and 26 is adjusted. In the view of FIG. 2, the motor shaft 41 is visible with the two drive sheaves or pulleys 42 and 43 drivably connected thereto. The arms 31 and 32 can be seen here as reinforced by the channel-like, cross-sectional configuration and between the upstanding flanges 44. The transverse web portion 45 supports the required journalling at the pivots 33 and 34 and at the vertical axes of the shafts 27 and 29. The hubs 46 of brushes 37 and 38 are appreciated as askew to the plane of the brushes 37 and 38.

The open mesh cage 47 is supported by the frame 13 and the bar 36 so as to generally envelop the work area so that as debris is swept from the conveyor by the brushes 37 and 38, then impingement of the flung particles on the screen or cage 47 will cause a satisfactory cleaning and vertical drop of the debris through the open bottom 48. The cage 47 resembles a pair of mesh baskets inverted so that they are both open at the bottom. The baskets, thus visualized, are closed at the tops enveloping the arms 31 and 32 and closing toward the track or rail 12. The inner adjacent facing sides of the cage unit 47 are open to allow the brushes 37 and 38 to close and open against passing structure, i.e. chains, trolleys and attachments thereto. With the open bottom 48, the caging 47 drops debris and scale onto the floor beneath or to gather trays (not shown).

Figure 3:
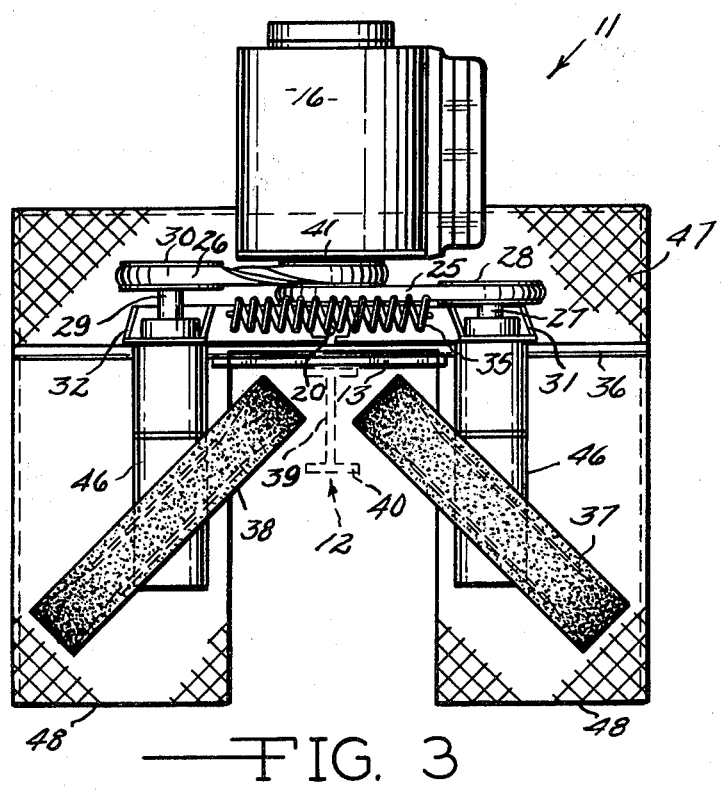
FIG. 3 is a front elevation view of the structures shown in FIGS. 1 and 2 and best illustrating the orientation of the brushes toward the rail or track on which the trolleys move urged by a chain drive, for example (not shown), and the cages for each brush avoid strewing the debris so that the debris can be dropped into a collector hopper at a collector station beneath each brush.

In the frontal view of FIG. 3 it is clear that the two arms 31 and 32 carry the brushes 37 and 38 and that the spring means 35 urges the convergence of the arms 31 and 32 and consequent convergence of the brushes 37 and 38 closing toward the track or rail 12. The askew hubs 46 connected to the vertical shafts 27 and 29 assure that upon rotation of the shafts 27 and 29 the brushes 37 and 38 will oscillate to sweep the zone between them while rotating and that the height of the zone will be substantially equal to the diameter of the brushes 37 and 38 and will be wear compensating. Hence, narrower and thus inexpensive brushes may be used.

The motor mounting 14, as disclosed, applies a uniform set tension to the V-belt drives 25 and 26 and by using the belting, if obstructions are encountered, the brushes 37 and 38 will expand or open and then the belts 25 and 26 will slip providing an overload protection for the motor 16. While an electric motor is shown, other drive means may be used as well known in the art and overhead shafting may also be employed to turn the drive sheaves or pulleys 42 and 43.

In operation, the units 11 thus described have been found easy to install and service and are durable, self-adjusting and the brushes are wear compensating far beyond the brush life contemplated in prior art devices. The units 11 reduce conveyor maintenance costs and the brush elements are less expensive than previously used brushes.

Having thus disclosed our invention and a preferred embodiment thereof, those skilled in the art will readily perceive changes, additions, improvements and modifications therein and such changes, additions, improvements and modifications within the skill of the art are intended to be included herein limited only by the scope of our hereinafter appended claims.

We claim:

1. A trolley and chain cleaner combination for conveyors and the like comprising:
   a mounting bracket adapted to be secured to a conveyor track;
   a motor on said bracket;
   a pair of brushes;
   hubs through said brushes askew to the plane of said brushes;
   support means for said hubs and brushes and having arms movable on a common pivot and operably secured to said bracket;
   drive means connected to each of said brushes and said motor; and
   resilient means urging said brushes toward each other.

2. A trolley and chain cleaner combination for conveyors and the like comprising:
   a mounting bracket adapted to be secured to a conveyor track;
   a pair of arms movable on a common pivot and operably secured to said bracket;
   a pair of vertical shafts in spaced-apart parallel relation;
   a brush connected to each of said shafts in askew relation thereto;
   journalled support means for said brushes and said shafts;
   drive means on said bracket connected to said shafts and driving said brushes in opposite directions in a wobbling, sweeping action; and
   resilient means acting on said arms urging said brushes toward each other.

3. A conveyor trolley and chain cleaner comprising:
   a mounting base adapted to be secured to a conveyor track;
   a motor bracket at one end of said base and slidably secured to said base;
   resilient means acting on said motor bracket and urging said bracket toward said one end of said base;
   a pair of arms pivotally secured to said base and extending from the other end of said base, said extending portions including substantially vertical journalling means, said arms supported adjacent the ends of said arms by said base and said arms biased resiliently toward each other;
   a brush secured to each of said vertical journal means and said brushes depending therefrom having askew hubs and said hubs having shafts supported by said journal means;
   a drive connection for turning said shafts and supported by said journals on the end of each of said arms;
   a motor on said motor bracket; and
   a pair of drive transmission elements, one drivably connected to one shaft and the other drivably connected to the other of said drive shafts and both of said drive transmission elements driven by said motor.

4. In the combination of claim 3 wherein said drive transmission elements drive one of said shafts in one direction of rotation and the other of said shafts in the other direction of rotation.

5. In the combination of claim 3 wherein said drive transmissions comprise V-belts and said drive connections are pulleys on said shafts, one of said pulleys driven by a crossed V-belt.

6. In the combination of claim 3 and including a debris cage supported by said mounting bracket and shielding adjacent environment from materials scraped or swept from trolleys and chain by said brushes.

* * * * *